United States Patent
McNeice et al.

(10) Patent No.: US 11,269,106 B2
(45) Date of Patent: Mar. 8, 2022

(54) METHOD FOR REMOVING THE EFFECT OF NEAR SURFACE GALVANIC DISTORTION IN SURFACE TO BOREHOLE EM MEASUREMENTS

(71) Applicants: Saudi Arabian Oil Company, Dhahran (SA); Schlumberger Technology Corporation, Sugar Land, TX (US)

(72) Inventors: Gary Wayne McNeice, Dhahran (SA); Daniele Colombo, Dhahran (SA); Nestor H. Cuevas, Milan (IT); Mauro Pezzoli, Milan (IT)

(73) Assignees: Saudi Arabian Oil Company, Dhahran (SA); SCHLUMBERGER TECHNOLOGY CORPORATION, Sugar Land, TX (US)

( * ) Notice: Subject to any disclaimer, the term of this patent is extended or adjusted under 35 U.S.C. 154(b) by 140 days.

(21) Appl. No.: 16/550,955

(22) Filed: Aug. 26, 2019

(65) Prior Publication Data
US 2021/0063598 A1   Mar. 4, 2021

(51) Int. Cl.
  *G01V 3/26* (2006.01)
  *G01V 3/08* (2006.01)
(52) U.S. Cl.
  CPC ........ *G01V 3/083* (2013.01); *G01V 2003/086* (2013.01)
(58) Field of Classification Search
  CPC . G01V 3/083; G01V 3/26; G01V 3/30; G01V 2003/086
  See application file for complete search history.

(56) References Cited

U.S. PATENT DOCUMENTS 7,852,087 B2   12/2010  Wilt et al.
2009/0039889 A1   2/2009  Wilt et al.
(Continued)

OTHER PUBLICATIONS

Davydycheva et al., Understanding and Overcoming Risks of CSEM for Reservoir Monitoring, 2018 SEG International Exposition and 88th Annual Meeting, pp. 1013-1017 (Year: 2018).*
(Continued)

*Primary Examiner* — Toan M Le
(74) *Attorney, Agent, or Firm* — Leason Ellis LLP (57) ABSTRACT

A system and method of evaluating and correcting for the effects of a near-surface anomaly on surface-to-borehole (STB) measurement data in a geological halfspace includes transmitting electromagnetic radiation from an EM source located on a ground surface which is positioned over the near-surface anomaly, measuring EM fields at a plurality of remote EM receivers located on the surface at a far distance from the EM source, obtaining vertical STB measurement data downhole, determining an orientation and moment of a secondary source equivalent dipole associated with the near-surface anomaly excited by the radiation transmitted by the EM source based on measurements of the EM fields at the plurality of remote receivers, determining a correction factor for the secondary source equivalent dipole on the EM field measurements at the plurality of remote receivers, and removing the effects of the near surface anomaly on the vertical STB measurement data using the correction factor.

12 Claims, 7 Drawing Sheets

(56) References Cited

U.S. PATENT DOCUMENTS

| | | |
|---|---|---|
| 2015/0204997 A1* | 7/2015 | Cuevas .................. G01V 3/26 |
| | | 324/338 |
| 2016/0282501 A1 | 9/2016 | Hibbs |
| 2017/0038492 A1 | 2/2017 | Nieuwenhuis et al. |
| 2017/0146681 A1 | 5/2017 | Cuevas et al. |

OTHER PUBLICATIONS

One Petro Search Results, May 7, 2021, 10 pp. (Year: 2021).*
Baranwal, V.C., "3-D Modelling Study of Borehold-seafloor Marine CSEM for Shallow Water Case," $71^{st}$ EAGE Conference & Exhibition—Amsterdam, The Netherlands, Jun. 2009, pp. 1-5.
Colombo, D. et al., "Quantifying surface-to-reservoir electromagnetics for waterflood monitoring in a Saudi Arabian carbonate reservoir," Geophysics, vol. 78, No. 6, Nov.-Dec. 2013, pp. E281-E297.
Liu, H., et al., "Frequency-domain 3D Borehole-surface Electromagnetic Modeling by the Volume Integral Equation Method," $70^{th}$ EAGE Conference & Exhibition—Rome, Italy, Jun. 2008, pp. 1-5.
Marsala, A.F. et al., "3D inversion practice for crosswell electromagnetic surveys in horizontal wells in Saudi Arabia," SEG New Orleans Annual Meeting, 2015 SEG; pp. 869-873, DOI http://dx.doi.org/10.1190/segam2015-5690118.1.
Torres-Verdín, C. et al., "Principles of spatial surface electric field filtering in magnetotellurics: Electromagnetic array profiling (EMAP)," Geophysics, vol. 57, No. 4, Apr. 1992, pp. 603-622.
International Search Report and Written Opinion in Corresponding PCT Application No. PCT/US2020/047721 dated Dec. 2, 2020. 11 pages.

* cited by examiner

METHOD FOR REMOVING THE EFFECT OF NEAR SURFACE GALVANIC DISTORTION IN SURFACE TO BOREHOLE EM MEASUREMENTS

FIELD OF THE DISCLOSURE

The present disclosure relates to oil and gas exploration and production, and, more particularly, relates to a method for removing the effects of near surface galvanic distortion in surface-to-borehole electromagnetic (EM) measurements.

BACKGROUND OF THE DISCLOSURE

Surface to borehole (STB) electromagnetic measurements can provide useful resolution of hydrocarbon reservoirs in both exploration and monitoring scenarios. Typically, the EM measurements are obtained using a surface electromagnetic source that emits a field that is measured downhole along the vertical direction (the direction in which the borehole extends) at reservoir depth. The EM source also excites geological features having resistivity in the subsurface. Accordingly, measurements performed downhole are a superposition of electromagnetic responses of the formations around the well at reservoir depth in addition to the responses in the overburden above the reservoir. In practice, the interpretation of the recorded data requires a priori knowledge of the overburden structure, particularly of inhomogeneous near-surface features.

Conventionally, the conductivity structure of the overburden has been determined by interpretation of seismic horizons and available well logs, surface non-seismic methods such as magnetotelluric (MT) detection, and by the interpolation of available well log information. However, the structure of the near-surface is rarely logged during conventional well logging operations and, furthermore, the short length scale of lateral variations cannot reliably be interpolated across well logs. The other techniques have not provided sufficiently accurate resolution of near-surface resistivity. Experience has proven that near-surface resistivity variation has a critical effect on surface to borehole measurements. These variations are often caused by "karstic" topography such as water-soluble, porous limestone deposits located close to the surface. Short-length-scale resistivity anomalies induce localized channeling of source currents, which manifest as distorted or "static shifted" borehole electric and magnetic field measurements at reservoir depth.

The various methods that have been proposed to determine the near surface variability of the resistivity structure, including for example time domain EM, direct current (DC) resistivity and, such as discussed in U.S. Pat. No. 7,852,087. However, known approaches can be compromised by the limited resolution of the detection techniques being utilized and by the density distribution of measurements. Furthermore, to simplify calculations, assumptions regarding the EM fields (for example, one-dimensionality for time-domain electromagnetic fields) are made in the processing and interpretation of the surface measurements, leaving unaccounted 3-D effects due to anomalies off-plane to the measurement configuration (for example, anomalies off plane to DC profiles). To obtain a suitable distribution of surface measurements using these techniques, the cost of operations required to perform a surface to borehole survey can increase dramatically.

SUMMARY OF THE DISCLOSURE

It would therefore be advantageous to provide an accurate and cost-effective method for determining near surface resistivity, enabling the effects of the resistivity in distorting EM measurements to be removed. The present disclosure addresses this and other needs in the art Embodiments of the present disclosure provide a method of evaluating and correcting for the effects of a near-surface anomaly on surface-to-borehole (STB) measurement data in a geological halfspace. A method according to the disclosure comprises transmitting electromagnetic radiation from an EM source located on a ground surface which is positioned over the near-surface anomaly, measuring EM fields at a plurality of remote EM receivers located on the surface and at a far distance from the EM source, obtaining vertical STB measurement data downhole in a borehole located within the halfspace, determining an orientation and moment of a secondary source equivalent dipole associated with the near-surface anomaly excited by the radiation transmitted by the EM source based on measurements of the EM fields at the plurality of remote receivers, determining a correction factor for the secondary source equivalent dipole on the EM field measurements at the plurality of remote receivers, and removing the effects of the near surface anomaly on the vertical STB measurement In certain implementations, the magnetic fields received at the plurality of remote receivers can be modeled as a superposition of the EM source, the secondary source equivalent dipole and a conductivity of the halfspace. The orientation and moment of the secondary source equivalent dipole and the conductivity of the halfspace can also be determined by an optimization process that best matches the set of EM field measurements obtained by the plurality of remote receivers (for example, all or most of the EM field measurements).

In certain implementations, the correction factor is a ratio of magnetic fields measured at the plurality of remote receivers to magnetic fields measured at the plurality of remote receivers when the EM source is not positioned over the near-surface anomaly.

In certain implementations, the plurality of remote receivers at least 4 kilometers (km) from the EM source. The near-surface anomaly is typically positioned in a range of about 5 meters to about 100 meters below the surface.

In certain implementations, the method can further include determining electrical properties of the geological halfspace.

Embodiments of the present disclosure also can be configured to provide a system for evaluating and correcting for the effects of a near-surface anomaly on STB measurement data in a geological halfspace. One such system comprises an EM source adapted to transmit EM radiation located on a ground surface which is positioned over the near-surface anomaly, a plurality of remote EM receivers located on the surface at a far distance from the EM source.

In certain implementations, the correction factor is a ratio of magnetic fields measured at the plurality of remote receivers to magnetic fields measured at the plurality of remote receivers when the EM source is not positioned over the near-surface anomaly, a downhole receiver positioned in a borehole within the halfspace adapted to obtain vertical STB electromagnetic field measurements, and a computing device configured, using computer-executable instructions, to: receive measurements of EM fields from the plurality of remote EM receivers and the downhole receiver; determine an orientation and moment of a secondary source equivalent dipole associated with the near-surface anomaly excited by the radiation transmitted by the EM source based on measurements of the EM fields at the plurality of remote receivers; determine a correction factor for the secondary source equivalent dipole on the EM measurements at the plurality of remote receivers; and remove the effects of the near surface anomaly on vertical STB measurements obtained by the downhole receiver using the correction factor.

In certain implementations, the plurality of remote receivers are located at least 4 km from the EM source. The near-surface anomaly is typically positioned in a range of about 5 meters to about 100 meters below the surface.

In certain implementations, the computing device is further configured to determine electrical properties of the geological halfspace. The computing device can be further configured to model magnetic fields received at the plurality of remote receivers as a superposition of the EM source, the secondary source equivalent dipole and a conductivity of the halfspace. The orientation and moment of the secondary source equivalent dipole and the conductivity of the halfspace can be determined using an optimization process that best matches the set of EM measurements obtained by the plurality of remote receivers (for example, all or most of the EM field measurements).

In some implementations, the correction factor is a ratio of magnetic fields measured at the plurality of remote receivers to magnetic fields measured at the plurality of remote receivers when the EM source is not positioned over the near-surface anomaly.

These and other aspects, features, and advantages can be appreciated from the following description of certain embodiments and the accompanying drawing figures and claims.

DESCRIPTION OF CERTAIN EMBODIMENTS OF THE DISCLOSURE

A system and method for evaluating the effects of near-surface karstic features on surface-to-borehole (STB) measurement data and for correcting any biases in the STB data due to the near-surface resistive features (for example, karsts, anomalies) is disclosed. Rather than attempting to map the near surface variability with localized measurements at the transmitter locations, the method isolates the effect of the features by obtaining reference measurements of the magnetic field at remote EM receiving stations, far from the survey area. It can be shown that the remote measurement of the magnetic field can be represented equivalently as the superposition of the fields excited by the primary source and those excited by a secondary source that arises from the accumulation of charges in the boundaries of the near-surface anomalies embedded in the surface in the vicinity of the primary source. In turn, the latter can be represented as a secondary, arbitrarily oriented, dipolar source, provided that the reference measurements are performed far enough away such that a dipole approximation holds. At a far enough distance, the exciting field propagates as a lateral surface wave; the energy propagates in the air medium and the earth response at the far reference location yields a quasi-perfect reflection of the magnetic field. Therefore, the far magnetic field at the remote station can be expressed as a function of the primary dipole, the induced dipole in the near-surface anomaly and the average conductivity of the halfspace (that is, the ground underneath the surface transmitter, modeled, without the karsts, as a homogeneous space).

In the methods disclosed herein, reference measurements at multiple locations distributed around the primary source are obtained. The properties of the primary source (moment and orientation) are assumed to be known. The properties of the secondary source in terms of its orientation and moment, together with the representative earth conductivity of the halfspace, are obtained using an optimization algorithm. Once the secondary source is characterized, it is used to predict the fields at the reference station. The ratio between the magnetic fields predicted from the secondary source and those measured is used to correct the vertical electric field downhole, removing the effect of the near-surface resistivity.

Figure 1A:
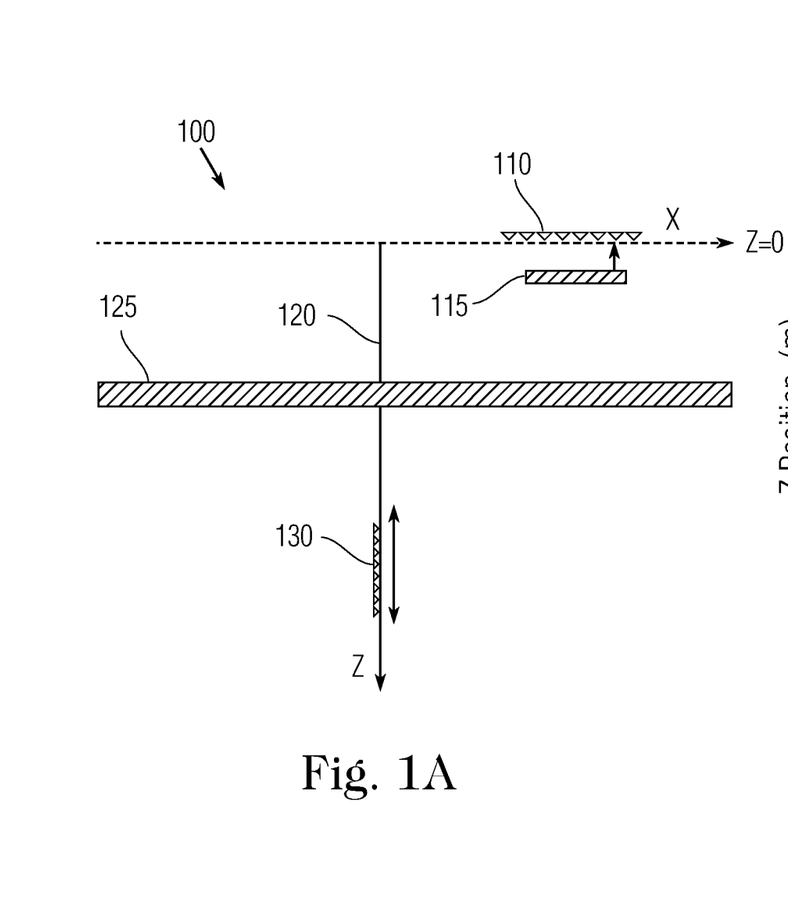
FIG. 1A is a cross-sectional view depicting a first surface-to-borehole (STB) measurement scenario illustrating the effect of near-surface resistive anomalies on downhole electric field ($E_z$) measurements.

FIG. 1A is a cross-sectional view depicting a first surface-to-borehole (STB) measurement scenario illustrating the effect of near-surface resistive anomalies on downhole electric field ($E_z$) measurements. A measurement system 100 includes a surface electromagnetic ("EM") field source 110 that is positioned on the surface of a geological formation containing a borehole 120. The EM field source 110 can comprise a plurality of electrodes arranged in a grid or other arrangement on the ground surface. The EM source 110 emits a low-frequency EM field (for example, 1-50 Hz) in all directions. Moreover, the electrodes can be activated to emit simultaneously or individually. In this manner, the x, y position of the EM source can be changed for purposes of measurement.

Figure 1B:
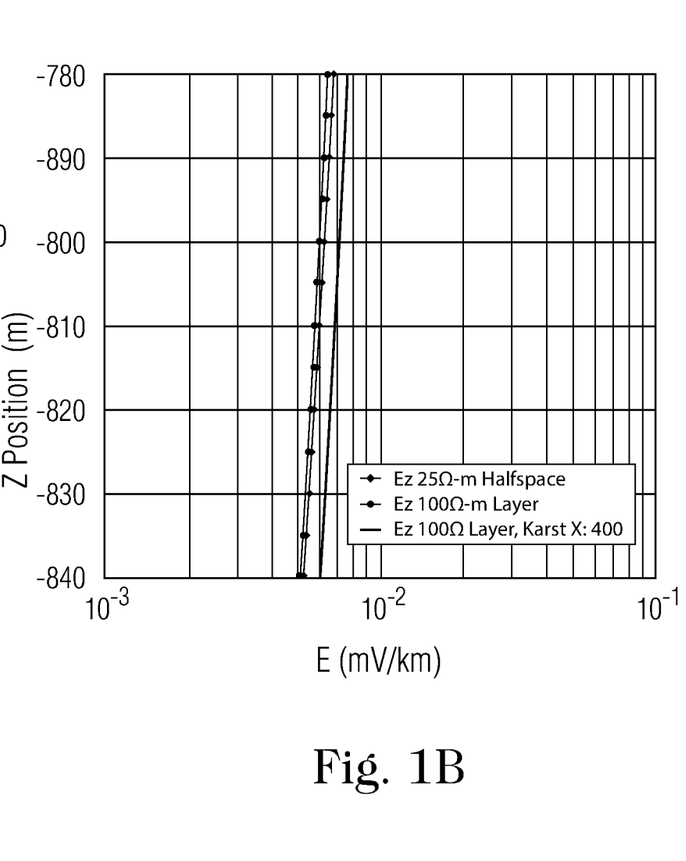
FIG. 1B is a graph of measurements of $E_z$ in millivolts per kilometer (mV/km) at downhole receivers as a function of depth (z) in the scenario of FIG. 1A.

In the example shown in FIG. 1A, a near-surface anomaly 115 ("near-surface resistive layer"), such as a karst feature, having a resistivity of 100 Ohm-meters is located 20 meters below the electric field source 110 in a 25 Ohm-meter halfspace. In the example depicted, the anomaly is 20 meters thick and 80 meters wide. In addition, there is an additional resistive layer 125 located at a depth of 100 meters below the surface. The additional resistive layer 125 is 40 meters thick and has 100 Ohm-meters resistivity. Measurement system 100 also includes a vertical array of receivers 130 is positioned in the borehole 120. The receivers 130 detect the vertical component of the electric field ($E_z$) emitted by the source 110 at a range of depths. FIG. 1B is a graph of measurements of $E_z$ at receivers 130 as a function of depth (z). Measurements of the field $E_z$ when the near-surface anomaly 115 is underneath the source are depicted in solid line. Measurements when the source is not positioned directly above the near-surface anomaly 115 (without interference from the near-surface layer 115) are depicted as diamonds, and baseline measurements taken in a homogeneous halfspace (without either resistivity layer 115, 125) are depicted as circles in FIG. 1B. For example, measurements of the halfspace can be taken inside a pre-existing borehole which reaches to reservoir depth.

As expected, a small difference can be observed between the diamonds and circles, indicating that the presence of the deeper resistive layer 125 slightly decreases the amplitude of the electric field $E_z$ observed at depth by the receivers 130. This effect is due to distortion of the current flow caused by the resistive layer 125. However, the presence of the near-surface anomaly 115 yields a strong distortion (solid line), causing a dramatic increase in the measured $E_z$ compared to baseline measurements. The increase in $E_z$ is generated by increased current density towards the well axis by the charges in the near-surface anomaly 115.

Figure 2A:
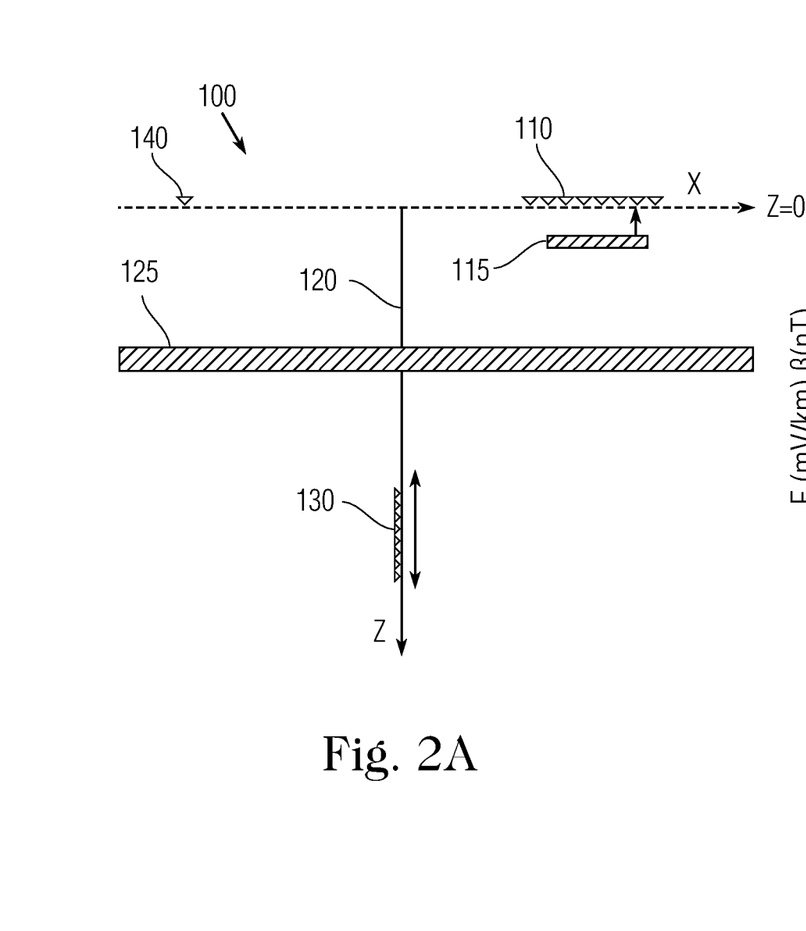
FIG. 2A is a cross-sectional view of a different STB measurement scenario in which a remote surface EM receiver station is installed on the surface at a far distance from the EM source according to the present disclosure.

FIG. 2A is a cross-sectional view of a different STB measurement scenario in which a remote surface EM receiver station 140 ("remote station") is installed at a far distance from the EM source 110 according to another implementation of the concepts described in the present disclosure. While the actual distance considered to be "far" will depend upon the strength the EM field generated by the source, as a rule of thumb, the terms "far distance" should be interpreted herein as meaning a distance of at least 4 kilometers. More generally, the far distance is such that the length scale of surface inhomogeneities are considered local to the transmitter position and that representation of the anomaly diction can be described by a localized source, dipolar in nature. As can be appreciated, while only one remote receiver 140 is shown in the cross-sectional view of FIG. 1A, a plurality of receiver stations can be installed in a circular or other arrangement on the surface at a far distance from the EM source.

Figure 2B:
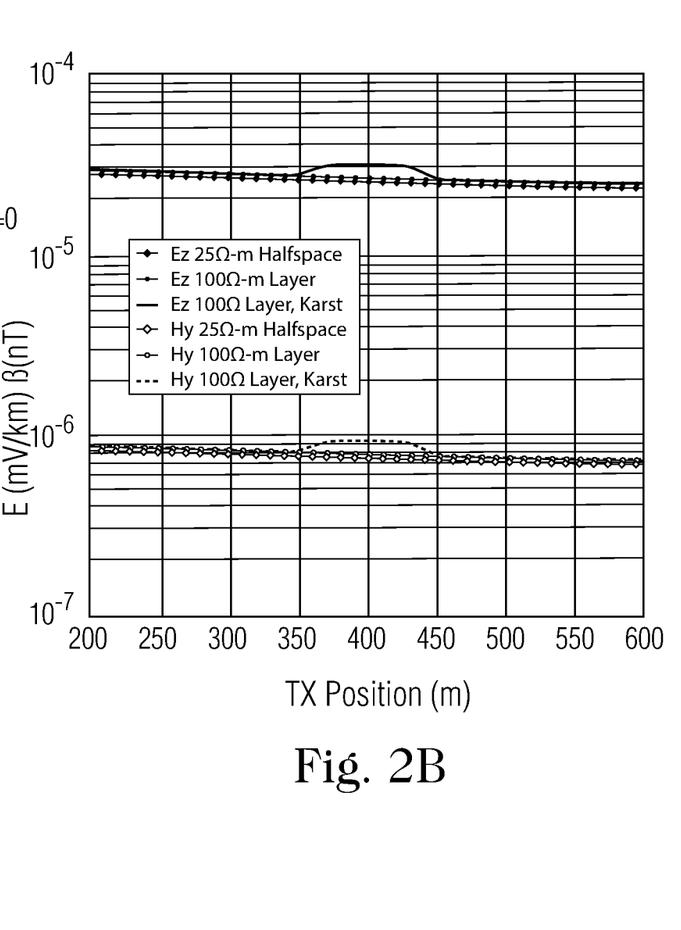
FIG. 2B is a graph of $E_x$ (x-component) measurements as a function of the horizontal position of the EM source in the scenario of FIG. 2A.

Measurements obtained at the remote station 140 record the components of the EM fields that travel along the surface, that is, the x-component of the electric field ($E_x$) and its transverse magnetic component ($H_y$). FIG. 2B is a graph of these $E_x$ measurements as a function of the horizontal position of the EM source. In this graph, similar to FIG. 1B, measurements are made for a homogeneous halfspace baseline (circles), a halfspace with an embedded deep resistive layer 125 (diamonds) with a near-surface anomaly 115 (solid line). As the source EM radiation passes over the resistive body of the near-surface anomaly 115, both the electric and magnetic fields are perturbed, indicating that the distortion originates at the source position and that it arises as a secondary source related to charge accumulation on the near-surface anomaly. The graph demonstrates that the electric field ($E_x$) changes in response to both the near surface anomaly 115 (depicted by the solid line) and the properties of the deeper resistive layer 125 (depicted by diamonds) since the values of $E_x$ recorded with the resistive layers are higher than the baseline values (depicted by circles). However, the magnetic field ($H_y$) observed in the homogeneous baseline (open circles) differs very little from that incorporating the resistive layer (open diamonds). These results demonstrate that the magnetic field ($H_y$) measured on the surface is sensitive to the localized near-surface karst anomalies but is insensitive to the properties of the deeper geological structure.

Figure 3A:
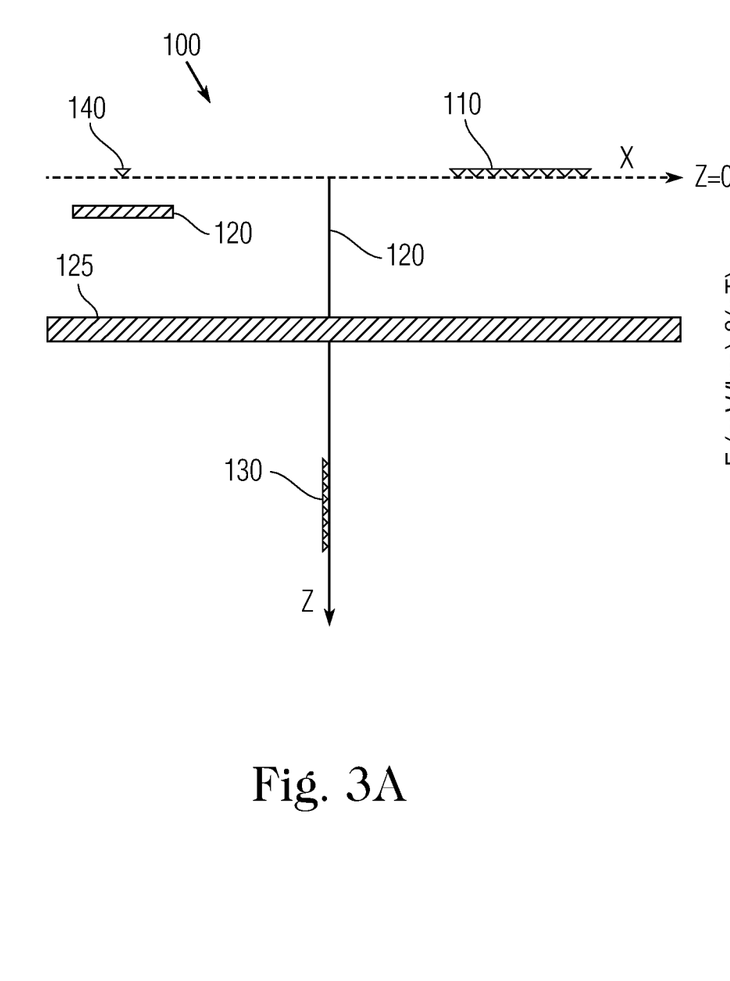
FIG. 3A is a cross-sectional view of another STB measurement scenario in which a near-surface resistive layer is positioned beneath the surface receiving station.
Figure 3B:
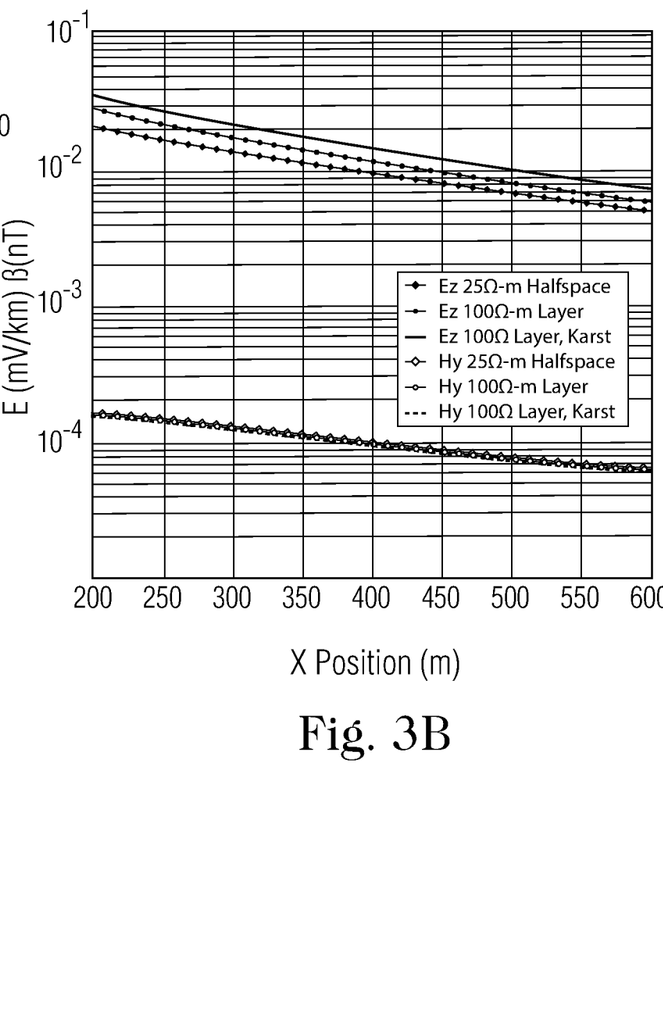
FIG. 3B is a graph of the amplitude of both $E_x$ and $H_y$ as a function of the source position in the scenario of FIG. 3A.

FIG. 3A is a cross-sectional view of another STB measurement scenario in which a near-surface resistive layer 155 is positioned beneath the surface receiving station 140 rather than beneath the EM source 110. The remote station in the scenario still receives the x-component of the electrical field ($E_x$) and y-component of the magnetic field ($H_y$) from the source 110. FIG. 3B is a graph of the amplitude of both $E_x$ and $H_y$ as a function of the source position, with measurements of a homogeneous halfspace depicted as circles, measurements of the half-space with deep resistive layer 125 depicted as diamonds, and measurements of the halfspace with the near-surface layer 155 depicted as a solid line. In this scenario, the electric field measured at the receiver position is sensitive to both the deep resistive layer 125 and the presence of the near-surface anomaly 155. The magnetic field however is insensitive to both the buried layer and the near surface anomaly 125. The results indicate that the fields observed at the far receiver position satisfy a plane-wave propagation regime, in which the incident magnetic field is almost perfectly reflected at the surface of the conducting earth, while currents are induced in the subsurface resulting in the measured electric fields. This behavior is similar to that observed in controlled source magnetotelluric systems that create "static" distortions of the electric field. See Torres-Verdin, C. and F. X. Bostick, Jr., 1992, *Principles of spatial surface electric field filtering in magnetotellurics: Electromagnetic array profiling (EMAP)*, Geophysics, Vol. 57, NO. 4, P. 603-622.

Figure 4:
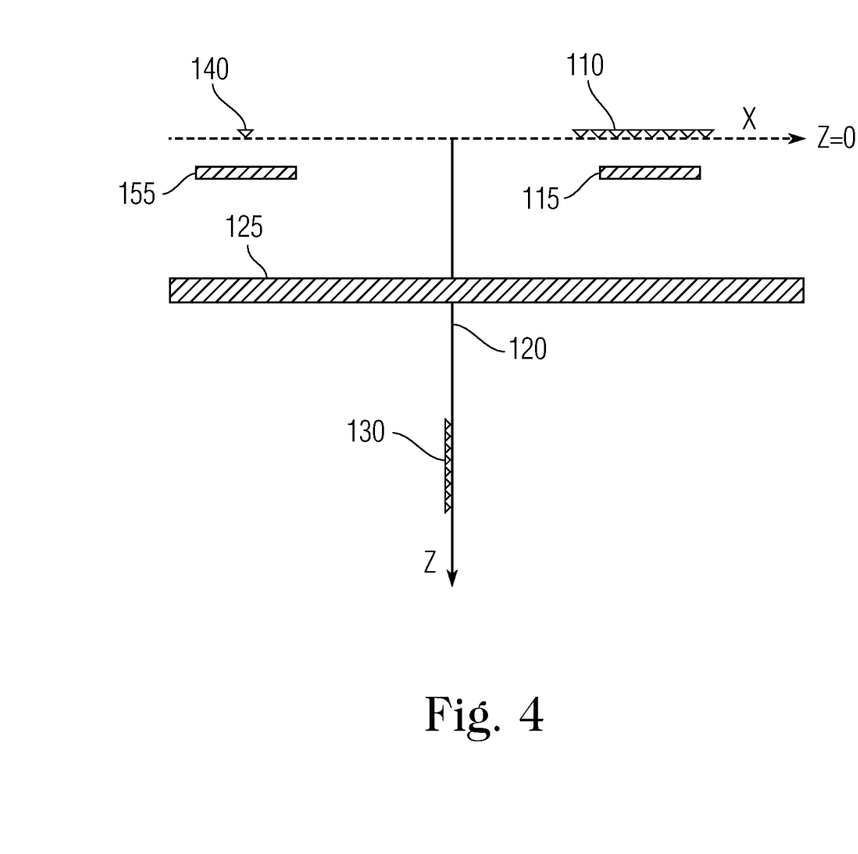
FIG. 4 is a cross-sectional view of another STB measurement scenario in which near surface anomalies are located underneath both the EM source and the remote receiver station.
Figure 5A:
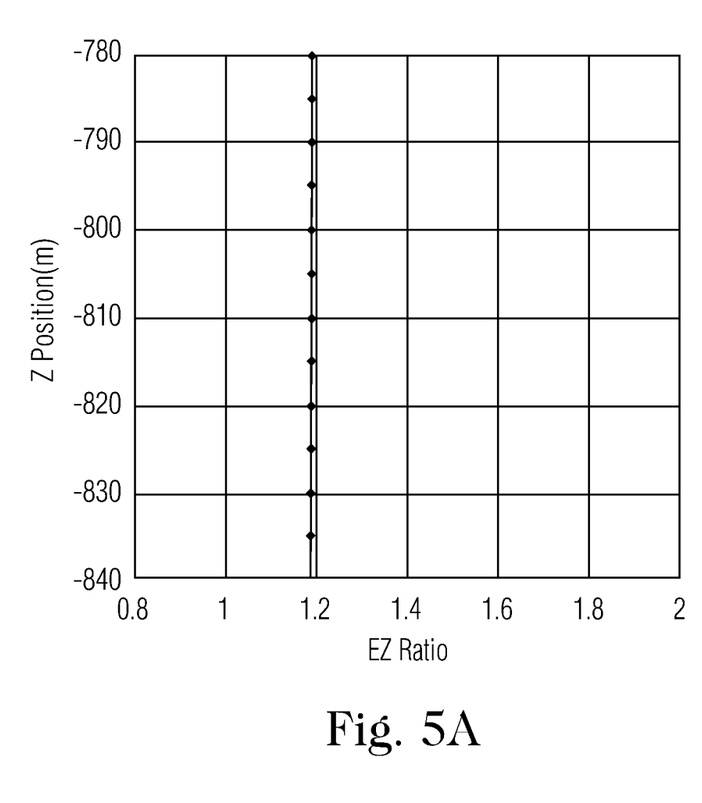
FIG. 5A is a graph of the ratio of the $E_z$ field measured downhole observed with the near surface anomaly to the $E_z$ field measured without the near surface anomaly, as a function of depth (z).
Figure 5B:
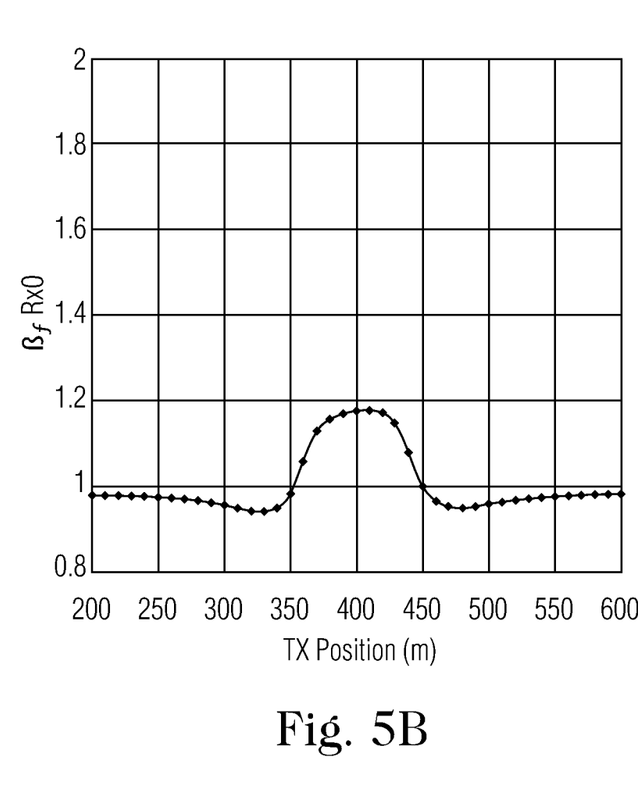
FIG. 5B is a graph of the ratio of the $B_y$ field measured at the remote surface station with the near surface anomaly to the $H_y$ field measured without the near surface anomaly as a function of depth (z).

Another scenario, shown in FIG. 4, depicts near surface anomalies 115, 155 located underneath both the EM source 110 and remote receiver station 140. The fields observed at both the surface and downhole receivers can be analyzed for the perturbation effect of the anomaly embedded underneath the source, which is ultimately the effect that perturbs the downhole measurement of the vertical electric field. FIG. 5A is a graph of the ratio of: i) the $E_z$ field measured downhole observed with the near surface anomaly to ii) the $E_z$ field measured without the near surface anomaly (as a function of depth (z)). FIG. 5B is a graph of the ratio of: i) the $B_y$ field measured at the remote surface station with the near surface anomaly to ii) the $H_y$ field measured without the near surface anomaly (as a function of depth source position (x)). FIG. 5A shows a uniform ratio of 1.2 (for $E_z$) at all depths, indicating that the vertical electric field rises by approximately 20% due to the near surface anomaly located below the center of the transmitter. FIG. 5B a maximum ratio of 1.2 for $H_y$ occurs when the source position is centered above the near surface anomaly. This shows that the ratio of the magnetic field is observed at the far station can be used to correct the bias observed on the downhole measurement of Ez. In effect, the maximum $H_y$ ratio of 1.2 can be used to cancel out the same ratio observed for Ez.

Figure 6:
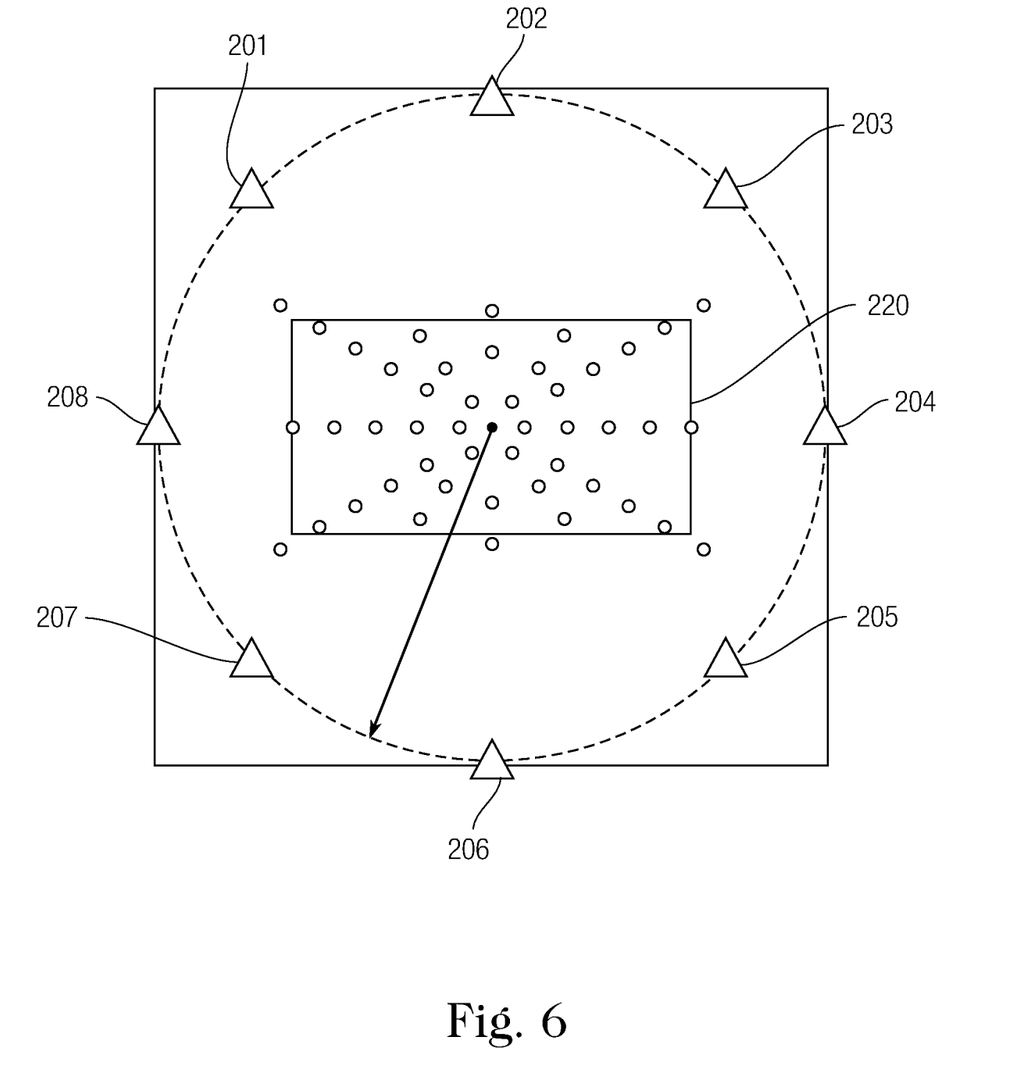
FIG. 6 is a plan view of an example measurement system according to the present disclosure including a plurality of receiving stations arranged around an EM source.

As noted previously, in certain embodiments, the electric and magnetic fields excited at the source location are recorded at multiple remote reference stations located far enough to attain a suitable signal to noise ratio while remaining in a plane-wave regime of propagation. FIG. 6 is a plan view of an example arrangement of a plurality of receiving stations 201, 202, 203, 204, 205, 206, 207, 208 positioned along a circle having radius of 11 km from the center of an EM source grid 220. The measurements of the magnetic fields ($H_y$) are used to determine the properties of the secondary source arising at the source location due to the anomaly located in close proximity to the transmitter.

The measurements made by the receiving stations can be collected and provided to a computing device for processing. The computing device, which includes hardware suitable for processing and memory storage, can be configured by software code or scripts to execute or otherwise run an optimization algorithm which determines the properties of the secondary source, specifically, the moment and orientation of an equivalent dipole, and the electrical conductivity of the halfspace. The algorithm can be configured to model the measured magnetic field data as a superposition of the primary EM source, the secondary source (equivalent dipole) and the conductive halfspace, in order to iteratively fit the dipole properties and halfspace conductivity using the magnetic field data obtained from the plurality of receiving stations in the set of receiving stations being utilized for this determination. In certain implementations, the algorithm can proceed using different combinations of the members of the set of remote receiving stations, with the results optionally being compared to gauge the precision (alikeness) of the various models to each other.

Figure 7:
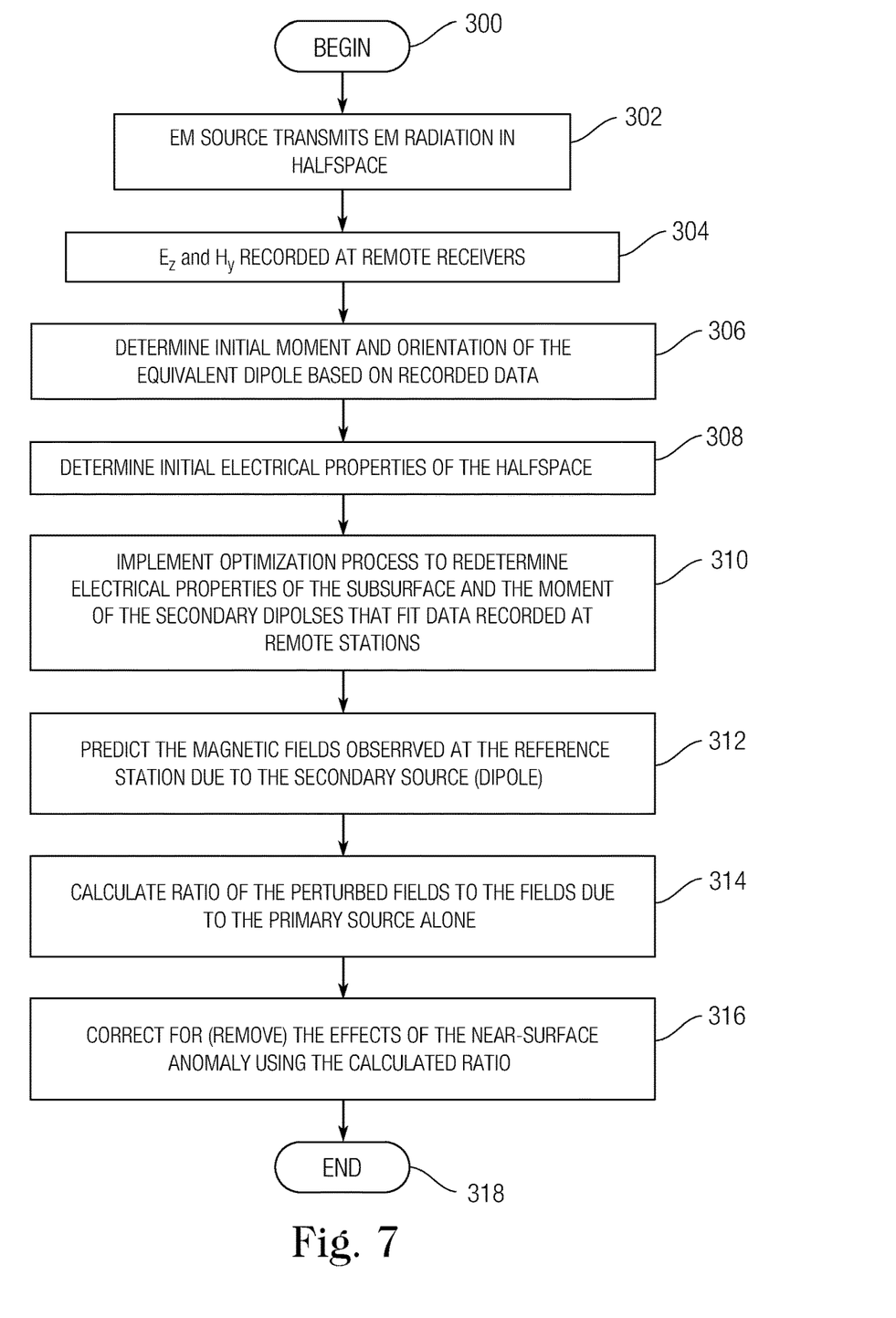
FIG. 7 is a flow chart of a method for removing the effects of a near-surface anomaly according to the present disclosure.

FIG. 7 is a flow chart of a method for removing the effects of a near-surface anomaly according to the present disclosure. The method begins in step 300. In step 302, a surface EM source transmits EM radiation in a geological halfspace. In step 304, $E_z$ and $H_y$ data as shown, for example, in FIGS. 2B, 3B, 5A and 5B is recorded at remote surface receivers. Near surface anomalies, which act as a secondary source EM, are represented by a secondary equivalent dipole of unknown moment and orientation. In step 306, the moment and orientation of the equivalent dipole is determined using the data recorded at the remote stations 201-208. The fields observed at the remote stations 201-208 are modeled as being excited by a superposition of the primary source dipole and the secondary equivalent dipole, embedded in a subsurface which has been modeled as a halfspace of unknown conductivity. Available information (resistivity well logs, seismic horizons, and so on) can be used to determine initial electrical properties of the halfspace in step 308. In step 310, starting with the initial electrical properties of the halfspace, an iterative optimization process is implemented that more precisely determines the electrical properties of the subsurface and the moment and orientation of the secondary dipole that best match (fit) the data recorded at a set of the remote reference stations, for example, 201-208, for instance, the data recorded at all of the remote reference stations, the data recorded at a majority of the remote reference stations, or the data recorded at another subset of the remote reference stations. In a following step 312, the equivalent dipole is used to predict the magnetic fields observed at the reference stations due to the secondary source only, which represents the perturbation of the near-surface anomaly. The ratio of the perturbed fields to the fields excited by primary source only can be computed in step 314. This ratio is a correction factor that can be used to remove the effects of the near-surface anomaly on downhole electric field measurements in step 316. The method ends in step 318.

The disclosed method can reduce operational costs. Costly near surface geophysical investigations to characterize the near surface are not required. Additionally, expensive operational procedures such as drilling boreholes to install transmitter electrodes below surface complexity can be avoided.

It is to be understood that any structural and functional details disclosed herein are not to be interpreted as limiting the systems and methods, but rather are provided as a representative embodiment or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the either of the terms "comprises" or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

It will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the invention without departing from the essential scope thereof. Therefore, it is intended that the disclosure not be limited to the particular embodiment disclosed as the best mode contemplated will include all embodiments falling within the scope of the disclosure as understood by those of ordinary skill in the art.

What is claimed is:

1. A method of evaluating and correcting for effects of a near-surface anomaly on surface-to-borehole (STB) measurement data in a geological halfspace, the method comprising:

transmitting electromagnetic radiation from an EM source located on a ground surface which is positioned over the near-surface anomaly;

measuring EM fields at a plurality of remote EM receivers located on the surface and at a far distance from the EM source;

obtaining vertical STB measurement data downhole in a borehole located within the halfspace;

determining an orientation and moment of a secondary source equivalent dipole associated with the near-surface anomaly excited by the radiation transmitted by the EM source based on measurements of the EM fields at the plurality of remote receivers;

determining a correction factor for the secondary source equivalent dipole on the EM field measurements at the plurality of remote receivers; and removing the effects of the near surface anomaly on the vertical STB measurement data using the correction factor;

wherein the correction factor is a ratio of magnetic fields measured at the plurality of remote receivers to magnetic fields measured at the plurality of remote receivers when the EM source is not positioned over the near-surface anomaly.

2. The method of claim 1, wherein magnetic fields received at the plurality of remote receivers is modeled as a superposition of the EM source, the secondary source equivalent dipole and a conductivity of the halfspace.

3. The method of claim 2, wherein the orientation and moment of the secondary source equivalent dipole and the conductivity of the halfspace are determined by an optimization process that best matches a set of the EM field measurements obtained by the plurality of remote receivers.

4. The method of claim 1, wherein the far distance at which the plurality of EM receivers are positioned is at least $2000*\sqrt{(\rho/f)}$ in meters in which p is a resistivity of the halfspace and f is a frequency of the radiation transmitted by the EM source.

5. The method of claim 1, further comprising determining electrical properties of the geological halfspace.

6. The method of claim 1, wherein the near-surface anomaly is positioned in a range of about 5 meters to about 100 meters below the surface.

7. A system for evaluating and correcting for effects of a near-surface anomaly on surface-to-borehole (STB) measurement data in a geological halfspace, the system comprising:

an EM source adapted to transmit EM radiation located on a ground surface which is positioned over the near-surface anomaly;

a plurality of remote EM receivers located on the surface at a far distance from the EM source;

a downhole receiver positioned in a borehole within the halfspace adapted to obtain vertical STB electromagnetic field measurements; and a computing device configured, using computer-executable instructions, to:

receive measurements of EM fields from the plurality of remote EM receivers and the downhole receiver;

determine an orientation and moment of a secondary source equivalent dipole associated with the near-surface anomaly excited by the radiation transmitted by the EM source based on measurements of the EM fields at the plurality of remote receivers;

determine a correction factor for the secondary source equivalent dipole on the EM measurements at the plurality of remote receivers; and remove the effects of the near surface anomaly on vertical STB measurements obtained by the downhole receiver using the correction factor;

wherein the correction factor is a ratio of magnetic fields measured at the plurality of remote receivers to magnetic fields measured at the plurality of remote receivers when the EM source is not positioned over the near-surface anomaly.

8. The system of claim 7, wherein the far distance at which the plurality of EM receivers are positioned is at least $2000*\sqrt{(\rho/f)}$ in meters in which p is a resistivity of the halfspace and f is a frequency of the radiation transmitted by the EM source.

9. The system of claim 8, wherein the computing device is further configured to model magnetic fields received at the plurality of remote receivers as a superposition of the EM source, the secondary source equivalent dipole and a conductivity of the halfspace.

10. The method of claim 9, wherein the computing device is further configured to determine the orientation and moment of the secondary source equivalent dipole and the conductivity of the halfspace using an optimization process that best matches the set of EM measurements obtained by the plurality of remote receivers.

11. The system of claim 7, wherein the computing device is further configured to determine electrical properties of the geological halfspace.

12. The system of claim 7, wherein the near-surface anomaly is positioned in a range of about 5 meters to about 100 meters below the surface.

* * * * *